United States Patent
Vosbikian

(10) Patent No.: US 7,930,995 B2
(45) Date of Patent: Apr. 26, 2011

(54) BIRD FEED TRAY

(75) Inventor: Peter S. Vosbikian, Moorestown, NJ (US)

(73) Assignee: Zenith Innovation, LLC, Delran, NJ (US)

( * ) Notice: Subject to any disclaimer, the term of this patent is extended or adjusted under 35 U.S.C. 154(b) by 217 days.

(21) Appl. No.: 12/386,205

(22) Filed: Apr. 15, 2009

(65) Prior Publication Data

US 2010/0263598 A1    Oct. 21, 2010

(51) Int. Cl.
*A01K 39/01*    (2006.01)
*B65D 1/34*    (2006.01)
(52) U.S. Cl. ............... 119/57.8; 206/561; 211/133.4
(58) Field of Classification Search ........... 119/52.1, 119/52.2, 57.8, 51.01, 469; 206/561; 211/126.1, 211/133.4, 196, 205, 36
See application file for complete search history.

(56) References Cited

U.S. PATENT DOCUMENTS

| | | | | |
|---|---|---|---|---|
| 3,136,296 | A | * | 6/1964 | Luin .......................... 119/52.2 |
| D244,786 | S | * | 6/1977 | Dryden ...................... D30/128 |
| 4,958,595 | A | * | 9/1990 | Richman et al. ............ 119/52.2 |
| D444,676 | S | * | 7/2001 | Murphy ..................... D7/553.6 |
| 6,354,244 | B1 | * | 3/2002 | Green ........................ 119/429 |
| D609,864 | S | * | 2/2010 | Tsai .......................... D30/127 |
| D611,662 | S | * | 3/2010 | Vosbikian .................. D30/128 |
| D623,805 | S | * | 9/2010 | Vosbikian .................. D30/127 |
| 2006/0225658 | A1 | * | 10/2006 | Baynard ..................... 119/57.8 |

* cited by examiner

Primary Examiner — Rob Swiatek
Assistant Examiner — Kristen C Hayes
(74) Attorney, Agent, or Firm — Stuart M. Goldstein

(57) ABSTRACT

A bird feed tray has an integral, unitary body. The tray is separated into a plurality of segments by partitions and circumscribed by an outer wall or rim. Each segment has dual surfaces which are sloped both downward toward the outer rim and inward to form a drain trough. The troughs terminate at the outer rim. A number of drain holes are provided adjacent to the outer rim. Water which collects on the surface of the tray funnels down into the troughs, where it is discharged through the drain holes.

10 Claims, 5 Drawing Sheets

BIRD FEED TRAY

BACKGROUND OF THE INVENTION

When the food from bird feeders, after it is disturbed by feeding birds, falls onto the ground, it is usually lost. In order to salvage this food, feed trays are sometimes positioned under the feeder to catch fallen bird food and also to provide an additional perch for feeding birds. An example of such a feed tray is seen in co-pending application Ser. No. 12/228, 108, entitled Modular Bird Feeder System.

While such feed tray components are successful in receiving bird food falling from the bird feeder housings, the trays are also a repository for rainwater which collects and then stagnates in the tray. This often results not only in producing a rancid odor, but also saturates and makes the food in the tray inedible. If left there long enough, the water will mix with leaves and other debris to present a breeding ground for insects.

Existing feed trays have openings for draining water. However, none of these prior trays are configured to quickly, efficiently, and effectively drain substantially all the water in the tray, to allow the tray to dry, and thus avoid the resulting water accumulation problems.

SUMMARY OF THE INVENTION

It is thus an object of the present invention to address the disadvantages and limitations of prior bird feed trays.

It is an object of the present invention to provide a bird feed tray which is configured to quickly, efficiently, and effectively drain all water which accumulates in the tray.

It is another object of the present invention to provide a bird feed tray which, by draining all accumulated water in the tray, salvages the bird food in the tray for consumption by birds.

It is still another object of the present invention to provide a bird feed tray which, by draining accumulated water in the tray, eliminates the collection of stagnant water and its resulting odor and potential insect breeding grounds.

It is a further object of the present invention to provide a bird feed tray which is easy and economical to manufacture and readily adaptable for use with pole bird feeders, with hanging or suspended feeders, or as an independent hanging or elevated feeder.

These and other objects are accomplished by the present invention, a unitary body, bird feed tray. The tray is separated into a plurality of segments by partitions and circumscribed by an outer wall or rim. Each segment has dual surfaces which are sloped both downward toward the outer rim and inward to form a drain trough. The troughs terminate at the outer rim. A number of drain holes are provided adjacent to the outer rim. Water which collects on the surface of the tray funnels down into the troughs, where it is discharged through the drain holes.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
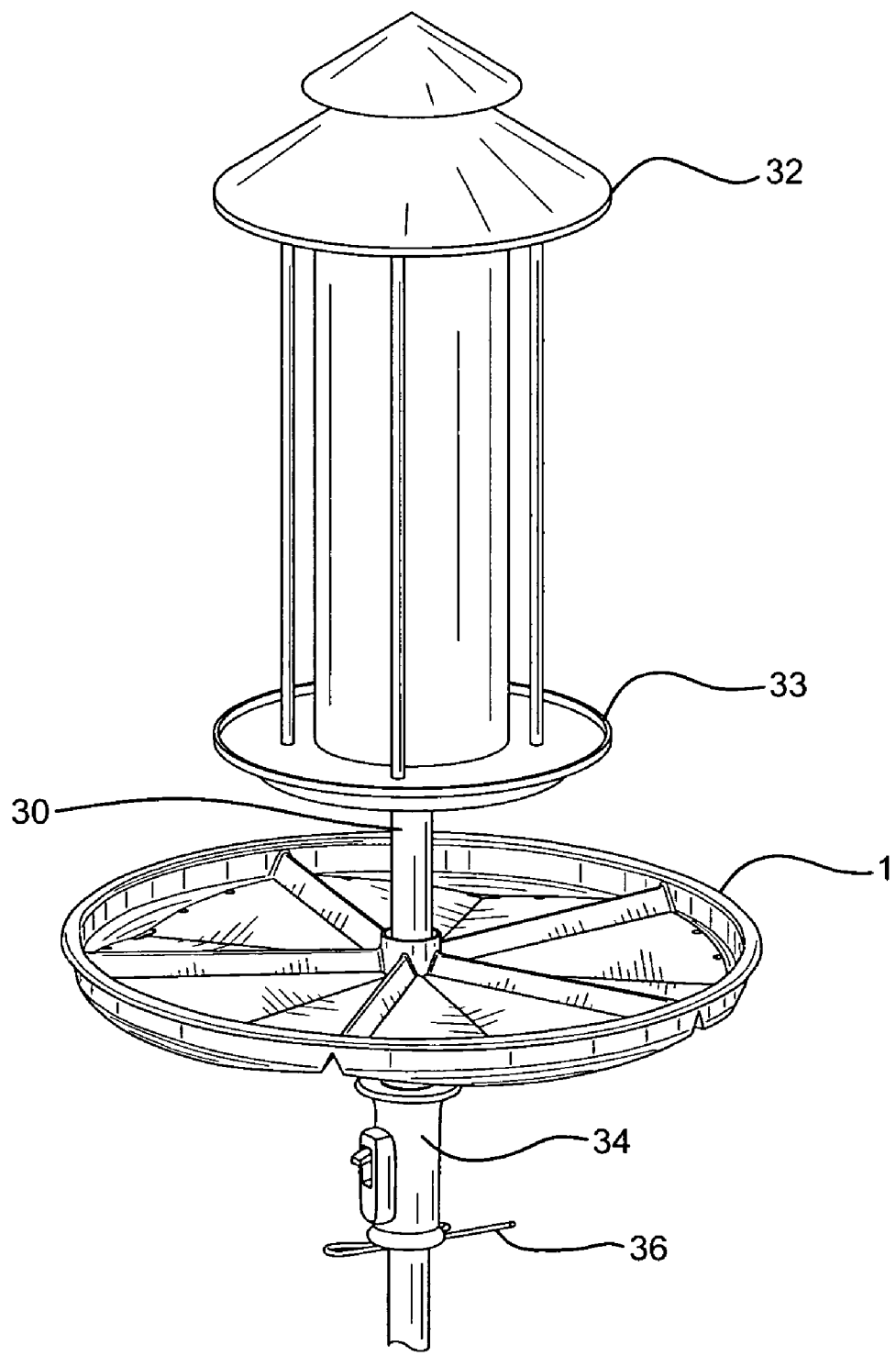
FIG. 1 is a view of the bird feed tray of the present invention installed beneath a pole mounted bird feeder.
Figure 2:
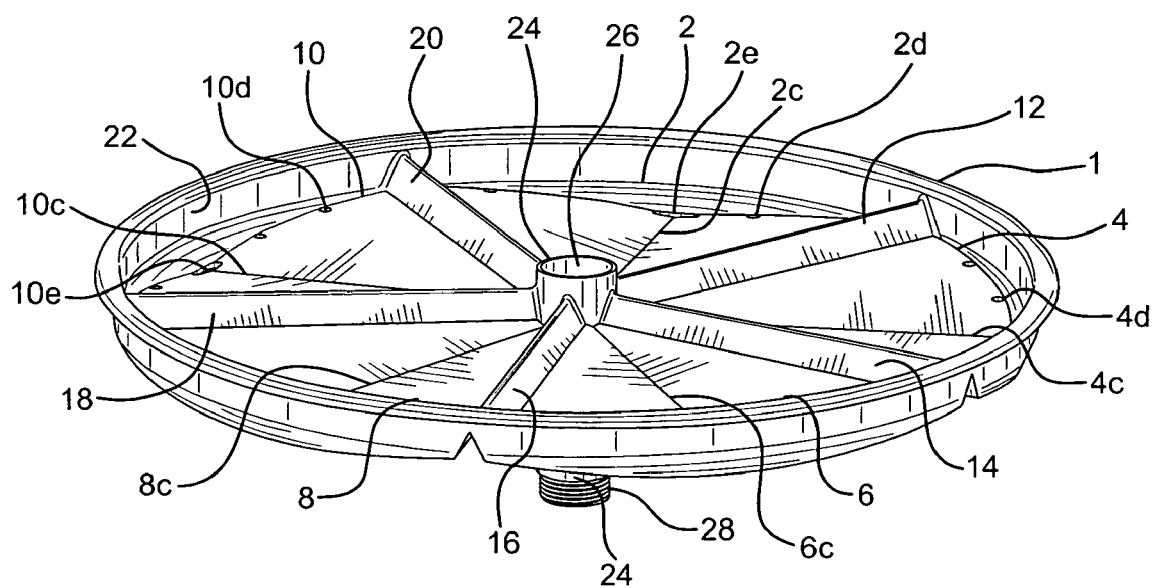
FIG. 2 is a top isometric view of the bird feed tray shown in FIG. 1.

Bird feed tray 1 of the present invention is shown mounted on pole 30 beneath bird feeder 32 in FIG. 1. As best shown in FIG. 2, bird feed tray 1 comprises a unitary body comprising segments 2, 4, 6, 8, and 10 which are separated by partitions 12, 14, 16, 18, and 20 extending outward from the center section of the body. Outer wall or rim 22 circumscribes bird feed tray 1 and constitutes the terminus of the segments. Although bird feed tray 1 is shown as being circular in configuration with five separate segments, it is contemplated that the feed tray can be any appropriate, desired configuration and can comprise a different number of segments. The invention is not to be considered restricted to the configuration of the bird feed tray or the number of segments therein.

Figure 3:
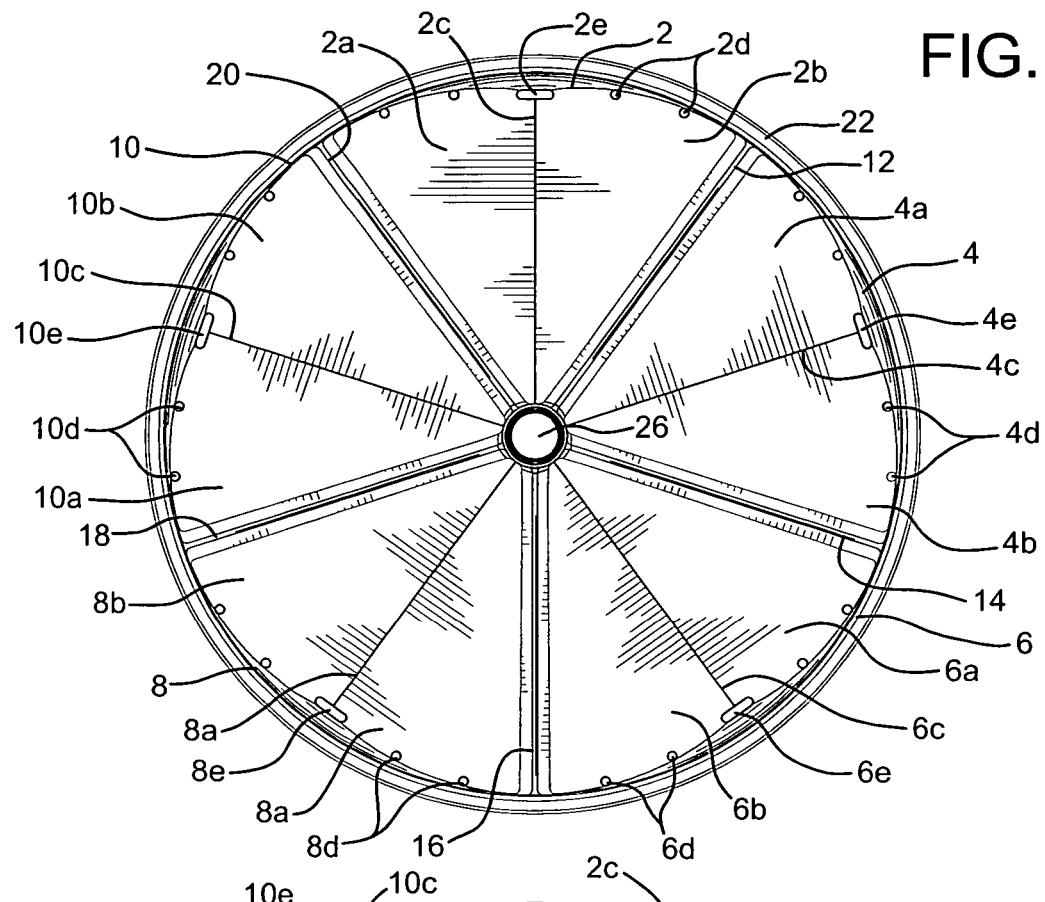
FIG. 3 is a top view of the bird feed tray shown in FIG. 1.
Figure 4:
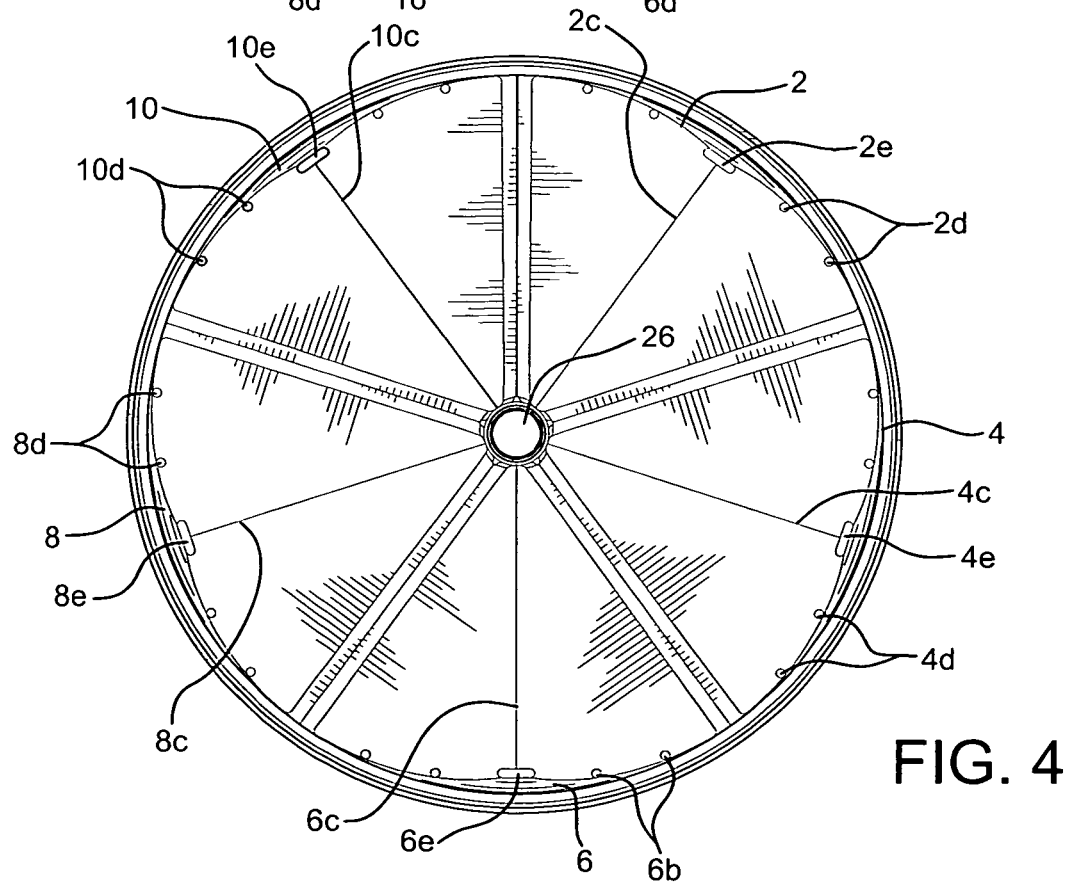
FIG. 4 is a bottom view of the bird feed tray shown in FIG. 1.
Figure 5:
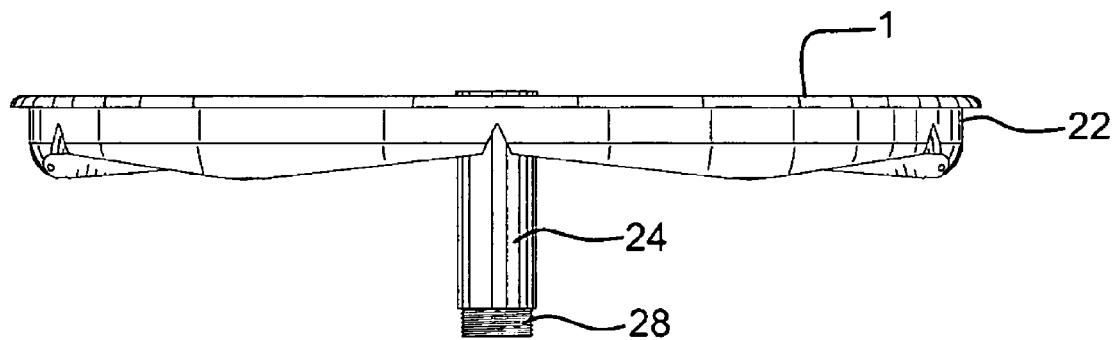
FIG. 5 is a elevation view of the bird feed tray shown in FIG. 1.
Figure 6:
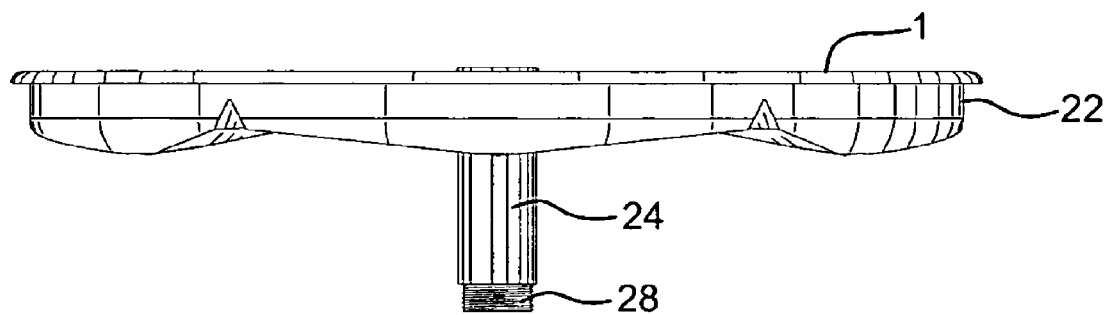
FIG. 6 is another elevation view of the bird feed tray shown in FIG. 1.

As best seen in FIGS. 3 and 4, segment 2 comprises inclined surfaces 2a and 2b sloped or angled downwards towards rim 22. Surfaces 2a and 2b are also sloped inward toward each other and drain trough 2c is formed at the intersection of the surfaces. Drain through 2c extends substantially the length of the segment. Similarly, segment 4 comprises inclined surfaces 4a and 4b similarly sloped to form trough 4c. Segment 6 comprises sloped surfaces 6a and 6b forming trough 6c. Segment 8 comprises sloped surfaces 8a and 8b to form trough 8c. Segment 10 comprises sloped surfaces 10a and 10b to form trough 10c. Segment surface drain holes 2d, 4d, 6d, 8d, and 10d are located at the outer edges of segments 2, 4, 6, 8, and 10, respectively, adjacent to rim 22. Similarly, trough drain holes 2e, 4e, 6e, 8e, and 10e are located at the end of the troughs of the respective segments, also adjacent to rim 22.

The outer ends of partitions 12, 14, 16, 18, and 20 terminate at rim 22. The inner ends of the partitions terminate at the center section of the unitary body, at central cylindrical sleeve 24. Sleeve 24 comprises through opening 26 and threads 28. As shown in FIG. 1, pole 30, supporting bird feeder 32, is inserted through opening 26 of sleeve 24 of bird feed tray 1, such that the feed tray is located directly under the bird feeder. Bird feed tray 1 is held elevated in place on pole 30 by any number of means. For instance, sleeve 24 may be provided with threads 28 which can engage a lower section of pole 30 or other bird feeder component, e.g. pole brake 34 as seen in FIG. 1. Bird feed tray 1 can also be maintained in position on pole 30 by insertable stop pin 36, used alone or in combination with pole brake 34, also as seen in FIG. 1. The means to maintain feeder 32 in position are not to be considered limited to that which is described herein.

In use, bird food will spill onto bird feed tray 1, as birds are perched on and feed on upper feed tray 33. Food which falls onto bird feed tray 1 is also available, especially to larger perching birds. While water in prior feed trays will accumulate after a rain, saturating and making inedible food located on the trays, the present invention eliminates this problem, since rain water has no opportunity to collect on the bird feed tray 1. Water is caused to flow downwardly and inwardly on sloped surfaces 2a/2b, 4a/4b, 6a/6b, 8a/8b, and 10a/10b of their respective segments. Some of the water immediately drains out surface drain holes 2d, 4d, 6d, 8d, and 10d. The remaining water flows down into troughs 2c, 4c, 6c, 8c, and 10c, where it drains from the tray via trough drain holes 2e, 4e, 6e, 8e, and 10e.

Figure 7:
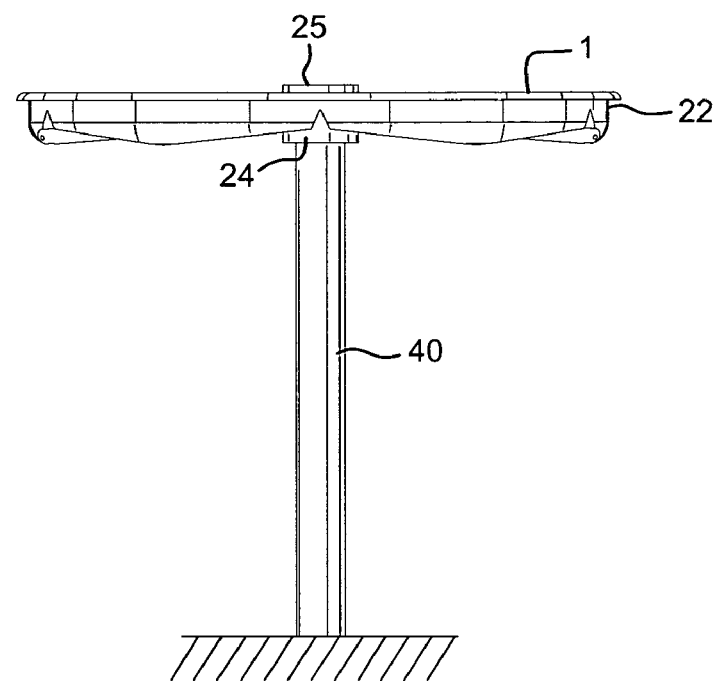
FIG. 7 is an elevation view of the bird feed tray of the present invention installed atop a pole.
Figure 8:
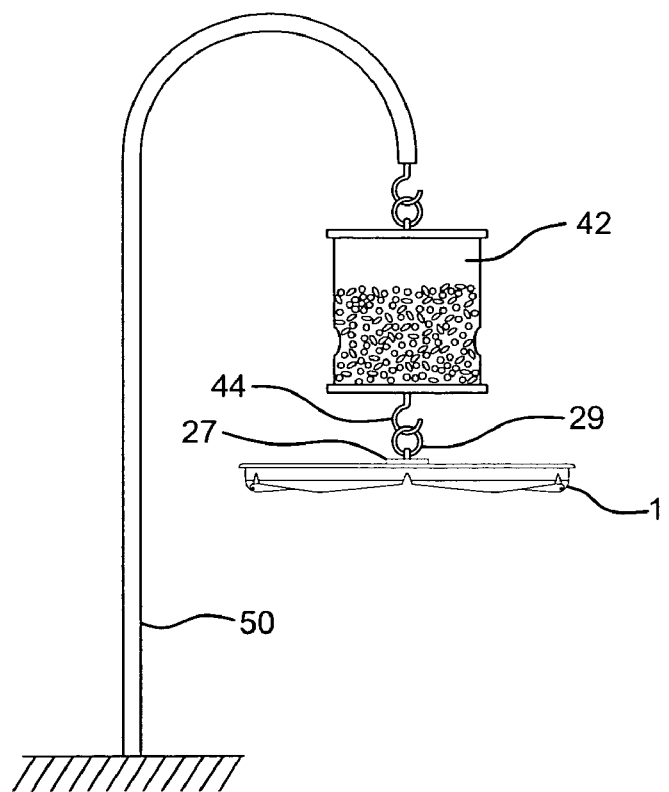
FIG. 8 is an elevation view of the bird feed tray of the present invention modified to be suspended from a bird feeder.

Bird feed tray 1 can be adapted for use with virtually any elevated bird feeder and can even be employed independently as a feeder. For example, FIG. 7 shows bird feed tray 1 used strictly as a feeder, mounted on top of pole 40. For this use, cap 25 encloses the top of sleeve 24. Pole 40 can be threadably engaged to sleeve 24 or attached in an equivalent manner. FIG. 8 shows bird feed tray 1 comprising cap 27 with attachment loop 29. Hook 44 or like attachment component, is configured to extend through loop 29 to suspend bird feed tray 1 from feeder 42, hanging from pole 50. The herein examples of the manner the bird feed tray of the present invention may be used are provided for illustrative purposes only and are by no means to be considered restricted to these uses.

The bird feed tray of the present invention thus prevents the accumulation of water on the tray, causing the water to immediately drain from the tray's surface. The tray will then dry out quickly, as will the food on the tray, thereby salvaging this food for birds. The potential buildup of soggy debris, with its resulting odor and insect breeding areas, is also eliminated.

It is anticipated that the bird feed tray will be constructed of plastic, molded as a single unit, ensuring its ease and economy of manufacture.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A bird feed tray for a pole mounted bird feeder comprising:
an integral, unitary body circumscribed by an outer rim and having a center through opening for receiving a pole, said body comprising a plurality of segments separated by partitions, each segment having a center and surfaces sloped substantially downward towards the outer rim and substantially inward towards the center of the segment, and means adjacent to the outer rim for drainage of water which falls onto the surfaces of the segments of the body.

2. The bird feed tray as in claim 1 in which a drain trough is formed between the surfaces of each segment, whereby water on the surfaces flows to and collects in the troughs for discharge through the drainage means.

3. The bird feed tray as in claim 2 wherein each segment comprises two surfaces and the drain troughs are located at the intersection of these surfaces.

4. The bird feed tray as in claim 1 wherein the drainage means comprises a plurality of drain holes.

5. The bird feed tray as in claim 1 wherein each partition has inner and outer ends, the inner ends terminating at the center opening of the body and the outer ends terminating at the outer rim.

6. A bird feed tray for a pole mounted bird feeder comprising:
an integral unitary body having a center through opening for receiving a pole, said body comprising a plurality of segments separated by partitions extending outward from the center opening, each segment comprising a center and two surfaces, each surface sloped substantially downward away from the opening towards an outer rim and substantially towards the center of the segment, means within each segment for the accumulation of water which falls onto the surfaces of the segments, and means within each segment for drainage of water which falls onto the surfaces of the segments of the body.

7. The bird feed tray as in claim 6 wherein the means for accumulation comprises a drain trough within each segment, whereby water which falls on the segments collects in the drain troughs for discharge through the drainage means.

8. The bird feed tray as in claim 6 wherein the drainage means comprises a plurality of drain holes.

9. The bird feed tray as in claim 6 wherein a drain trough is formed between the two surfaces of each segment.

10. The bird feed tray as in claim 6 wherein each partition has inner and outer ends, the inner ends terminating at the center opening and the outer ends terminating at the outer rim.

* * * * *